United States Patent [19]
Rookey

[11] B 3,982,399
[45] Sept. 28, 1976

[54] FUEL DEGASSING METHOD

[75] Inventor: Earl T. Rookey, Long Beach, Calif.

[73] Assignee: Northrop Corporation, Los Angeles, Calif.

[22] Filed: Sept. 25, 1974

[21] Appl. No.: 509,238

[44] Published under the second Trial Voluntary Protest Program on February 24, 1976 as document No. B 509,238.

[52] U.S. Cl. .................................... 60/706; 55/182; 60/710; 60/721; 137/255; 137/567; 244/135 C; 417/430

[51] Int. Cl.² .................. F01B 21/04; F01B 25/00; F02C 9/04

[58] Field of Search ............. 60/643, 721, 698, 706, 60/710; 244/135 R, 135 C; 55/182 X; 417/430 X, 426, 435; 137/255, 265, 567

[56] References Cited
UNITED STATES PATENTS

| | | | |
|---|---|---|---|
| 2,932,309 | 4/1960 | Godden et al. | 137/255 X |
| 3,011,504 | 12/1961 | Klank, Jr. | 55/182 UX |
| 3,635,604 | 1/1972 | Petersen | 417/435 X |

Primary Examiner—Allen M. Ostrager
Attorney, Agent, or Firm—Willard M. Graham; William W. Rundle

[57] ABSTRACT

The method of purging entrained air or vapor from fuel stored in two or more tanks in an aircraft, and more particularly in multi-engine aircraft during crossfeed fuel delivery when the aircraft is climbing to altitude, which method consists of reversing the fuel booster pump, or pumps, in the temporarily unused tank, or tanks, while all fuel is withdrawn from one tank to supply the engines, whereby the fuel agitation produced by the reversed pump or pumps effectively frees the entrained air or vapor from the fuel to escape to atmosphere through the fuel tank vent system.

4 Claims, 2 Drawing Figures

FUEL DEGASSING METHOD

BACKGROUND OF THE INVENTION

The method described herein was discovered during the performance of United States Air Force Contract No. F33657—70—C—0717.

A well known industrial method of expelling or releasing entrained air or gas from a liquid is to subject the liquid to vigorous and continuous agitation using highly specialized apparatus. Examples of such methods and apparatus are disclosed in U.S. Pat. No. 3,769,779 for "Degassing Apparatus", U.S. Pat. No. 3,229,449 for "Mixing and Degassing Apparatus", U.S. Pat. No. 3,163,508 for "Method and Apparatus for Separating Gas From Liquid Rich Foams or Liquids Containing Entrained Air", and U.S. Pat. No. 2,575,923 for "Method and Apparatus for Pumping Volatile Fuels", to cite a few.

I have solved a serious problem, the solution to which has long eluded aircraft and flight test engineers. The problem concerns crossfeed fuel delivery as commonly employed in twin-engine aircraft such as the Northrop F-5A/B and F-5E aircraft, to equalize fuel loads that are unbalanced with respect to individual engine fuel supplies where the fuel is stored in two or more fuel tanks mounted in the interior of the fuselage of the aircraft, or in other applications where fuel remains dormant in a tank during a climb-to-altitude maneuver.

Fuel crossfeed delivery also is resorted to for obtaining normal operation of both engines in a twin-engine and multi-engine aircraft at any altitude with one engine not operating, or for utilizing all available fuel on board for single engine operation in a flight emergency situation for example.

A potentially dangerous problem frequently arises upon termination of crossfeed fuel delivery due to the presence of air or vapor entrained in the fuel stored in the fuel tank that was idle, i.e., unused, during the maneuver. When normal supply of fuel to both engines from their respective right and left hand fuel supply systems is resumed, following the crossfeed operation, slugs of air or vapor in the fuel enter the line and disrupt normal fuel flow therethrough to the pump inlet of the engine. These slugs of air or vapor can, and have, caused engine flame-out, i.e., abrupt cessation of engine operation. It can readily be appreciated that such a flame-out, under certain flight conditions, can result in loss of the aircraft and possibly the pilot.

The problem described above can also arise in single engine aircraft where fuel is stored in two or more tanks, in switching from one tank to another. That is to say, the fuel in the unused tanks becomes saturated with air or vapor. Thus when the pilot switches from one tank to another there is the ever present danger that slugs of air or vapor in the fuel from the fresh tank could cause the engine to flame out.

Thus it is an object and purpose of my discovery to provide a method of reducing substantially, and possibly eliminating, the risk that has been inherent in crossfeed fuel delivery during particular flight maneuvers described above, and in fuel tank switch-over in single engine aircraft.

It is a further object of the method of my discovery to substantially reduce, and possibly eliminate, the occurrence of engine flame-out due to the presence of air or vapor in fuel upon termination of crossfeed delivery without the addition of any weight or expensive specialized equipment to the aircraft.

It is a still further object of the method I have discovered to eliminate the problem of entrained air or vapor in fuel upon termination of crossfeed fuel delivery utilizing the standard fuel system components with which single and multi-engine aircraft are normally equipped.

The method of my discovery will be more clearly understood by reference to the drawings and following description.

DESCRIPTION OF THE INVENTION

Figure 1:
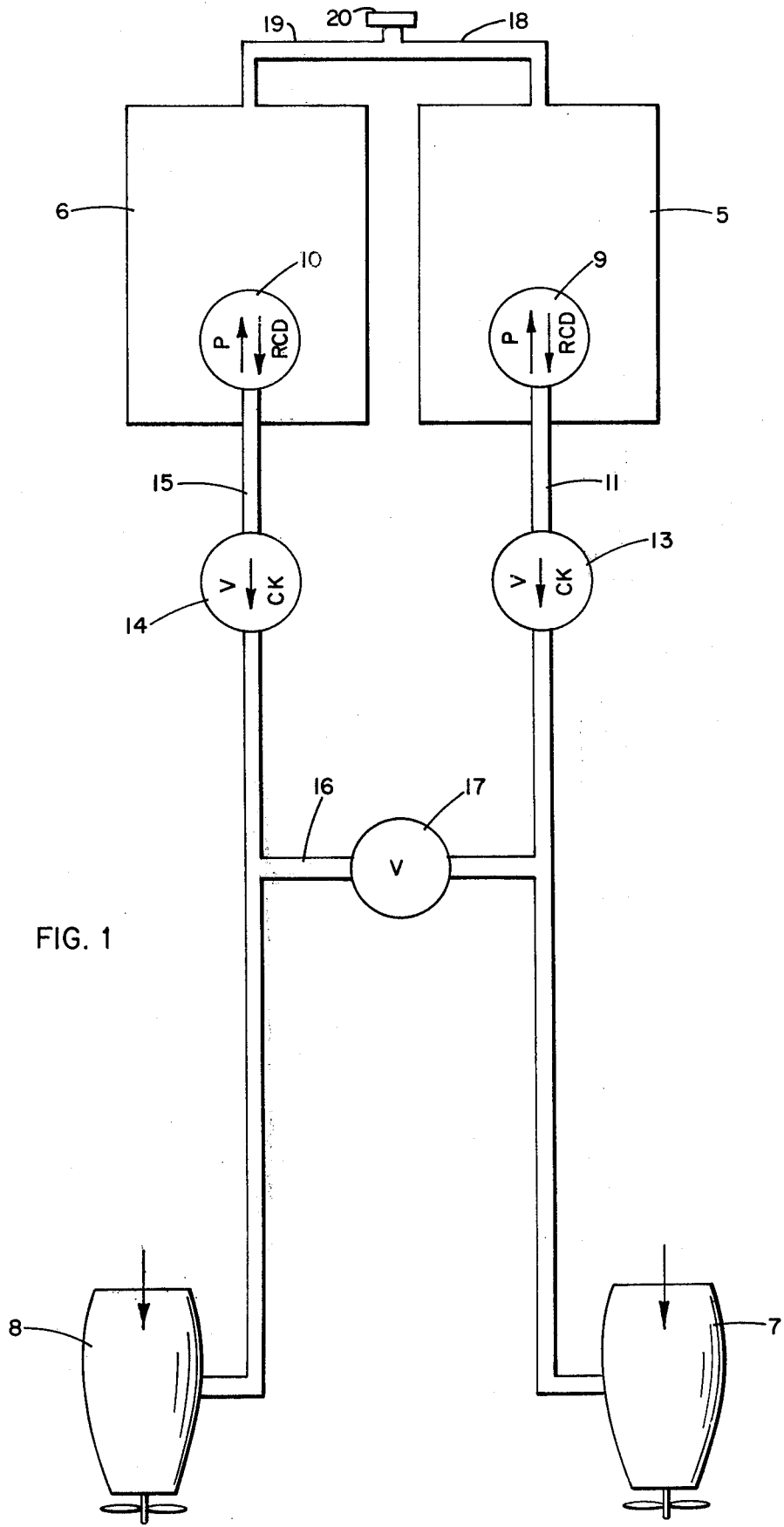
FIG. 1 is a simplified schematic drawing showing the fuel system for a multi-engine aircraft.

An example of a typical twin-engine jet aircraft fuel system, as used in the Northrop F-5 and F-5E fighter aircraft in which the method of my discovery has successfully been employed is shown in the simplified schematic diagram in FIG. 1 of the appended drawings, wherein two fuel storage tanks, a forward mounted tank 5 and an aft mounted tank 6 are provided in the interior of the aircraft fuselage (not shown), aft of the flight deck or cockpit.

Since the fuel system per se is more or less conventional, and no invention therein is claimed, a number of fuel system components such as fuel strainers, etc., that form an actual fuel system are omitted from the system diagram for the sake of clarity.

It will be understood that those skilled in the art that the engines 7 and 8 can either be mounted within the fuselage, as in the case of the F-5 and F-5E aircraft, or on the exterior of the aircraft, e.g., rear mounted adjacent the aft end of the aircraft, or wing mounted, in well known and conventional manners.

Each fuel tank 5 and 6 is equipped with a double-inlet centrifugal type booster pump 9 and 10 submerged in the tanks and each driven by a reversible electric motor which is operated by the pilot by means of a switch (not shown) located in the cockpit.

In normal fuel delivery the booster pump 9 in tank 5 delivers fuel to the right hand engine 7 through a fuel supply pipe or line 11, through a check valve 13 connected therein. The check valve 13 prevents reverse flow of fuel through the line 11 during crossfeed fuel delivery.

The left hand system, i.e., the booster pump 10, etc., of course operates in the same manner as the right hand system.

Downstream of the check valves 13 and 14 the right and left hand fuel supply lines 11 and 15, respectively, are interconnected by a crossfeed fuel supply line 16 controlled by an electrically actuated crossfeed valve 17 which is controlled by the pilot by means of a switch (not shown) located in the cockpit.

As well understood by those skilled in the art, fuel tanks 5 and 6, and any additional fuel tanks (not shown), are equipped with lines 18 and 19 connecting the tank interiors to the vent system generally indicated at 20.

Heretofore, in switching to crossfeed fuel delivery during a climb-to-altitude flight maneuver, the pilot positioned the switch to open the crossfeed valve and positioned the switch to shut off the fuel booster pump in one or the other of the right or left hand engine fuel supply tanks, depending upon the appropriate balancing requirement of the fuel load.

In this manner all fuel to both engines was supplied solely either from the right or left hand engine fuel supply tank.

During the climb-to-altitude maneuver, the fuel in the unused tank tends to become supersaturated with air and vapor. Upon termination of crossfeed fuel delivery when a given altitude was attained, and upon pilot selection of normal fuel delivery from both tanks, the vapor/liquid ratio capability of the fuel booster pump was exceeded and slugs of air and vapor entrained in the fuel pumped from the previously unused tank, and flowing through the fuel supply line to the engine pump inlet, frequently caused engine flame-out.

However, I have discovered that by making it possible to reverse the rotation of both booster pumps 9 and 10, i.e., with the addition of a simple circuit (not shown) in the fuel system control circuit, that during crossfeed fuel delivery reverse rotation of the booster pump in the unused fuel tank will continuously agitate the fuel therein to release the entrained air and vapor therefrom to escape out the fuel tank vent system 20 and thereby ensure the supply of relatively air-free fuel to the engine upon termination of crossfeed fuel delivery upon resumption of normal fuel delivery. It is well within the state of the art to add the simple circuit necessary to reverse the rotation of pumps 9 and 10.

According to the method of my discovery therefore, if the fuel load balancing operation requires the fuel to be withdrawn entirely from tank 6, the pilot positions the switch to reverse the rotation of the booster pump 9 in engine fuel supply tank 5, and positions the appropriate switch to open the crossfeed valve 17, whereby the fuel in the engine fuel supply tank 5 is continuously agitated during crossfeed fuel delivery, to release entrained air or vapor from the fuel during the climb-to-altitude or other maneuver.

If the fuel is required, conversely, to be withdrawn solely from the tank 5 to balance the fuel load, the identical sequence of switch operations is followed for the left hand system.

Figure 2:
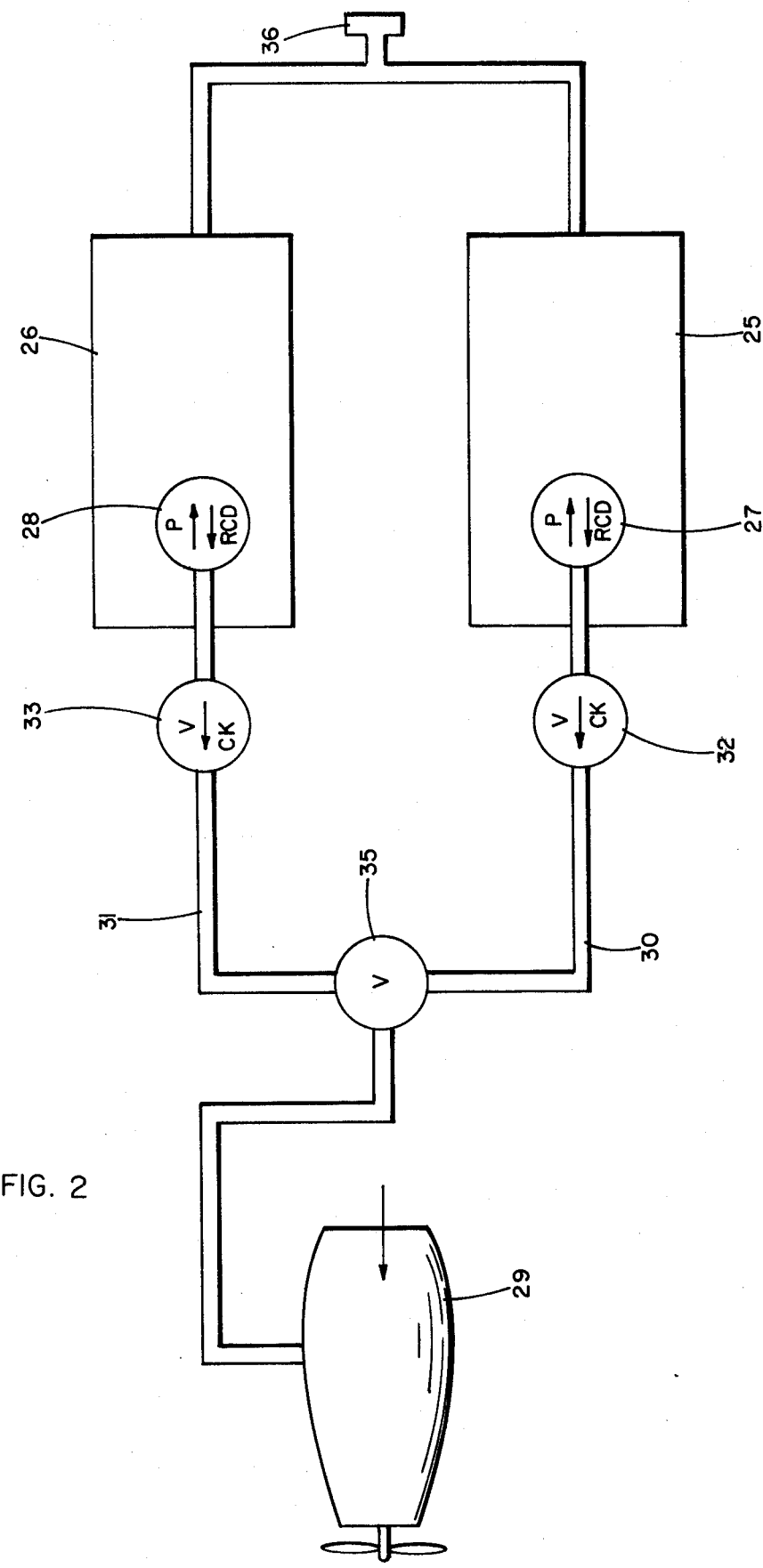
FIG. 2 is a simplified schematic drawing showing the fuel system for a single engine aircraft.

The method described above can be used with equal effectivity in a single engine aircraft equipped with two or more fuel tanks, as shown in the schematic drawing in FIG. 2, wherein two fuel tanks 25 and 26 are provided with double-inlet type fuel booster pumps 27 and 28 submerged therein, each driven by a reversible electric motor controlled by the pilot of the aircraft or by an automatic electrical switching circuit (not shown) as is used in the F-5E aircraft fuel system. Fuel is delivered by one or the other to the engine 29 through fuel supply lines 30 and 31. Check valves 32 and 33 are connected in the supply lines 30 and 31, in any convenient location, to prevent fuel from flowing back into the unused tanks when only one or the other pump is operating. A two-way valve 35 being controllable by the pilot to supply fuel from one tank or the other in the usual manner.

During the supply of fuel from one tank, the other being idle, the pilot simply reverses the pump in the unused tank to agitate the fuel therein thereby releasing the entrained air or vapor to escape through the vent system 36 to atmosphere so that when the pilot switches over to the fresh or unused tank a supply of air or vapor-free fuel to the engine 29 is assured.

While I have described the method of my discovery in terms of manually controlled switches for selectively reversing the fuel booster pump and opening the crossfeed valve, it is well within the ordinary skills of engineers to employ automatic sequence circuits to reverse the rotation of the fuel booster pumps with subsequent opening of the crossfeed valve, or vice versa, to practice the method of my discovery.

While the method of my discovery has been successfully employed in the F-5E aircraft to virtually eliminate the occurrence of engine flame-out due to slugs of air or vapor in the fuel, it will readily be apparent that my method will be equally effective in other single and multi-engine aircraft of the commercial as well as military type.

I claim:

1. A method of operating a fuel system in an aircraft equipped with two or more fuel tanks, each tank having a reversible fuel booster pump submerged therein and connected to an engine fuel supply line, said tanks being vented to atmosphere, and means to selectively reverse the rotation of said fuel booster pumps, said method comprising reversing the rotation of the fuel booster pump in the unused fuel tanks when all engine fuel is being supplied from one tank only, whereby the reversed fuel booster pump agitates the fuel in said unused tanks to release entrained air and vapor from said fuel to escape from said tank vents.

2. A method of operating a fuel system in a multi-engine aircraft in which, under normal flight operation thereof, a right hand engine is supplied with fuel by a right hand fuel supply system, and a left hand engine is supplied with fuel by a left hand fuel supply system, each of said engine fuel supply systems including at least one fuel storage tank provided with a reversible fuel booster pump submerged therewithin, fuel supply lines connecting said pumps with said engines, vent means for each tank, a crossfeed fuel supply lines interconnecting said right and left hand engine fuel supply lines downstream of said pumps and upstream of said engines, a pilot operated crossfeed control valve connected in said crossfeed fuel supply line between said right and left hand engine fuel supply lines, and means to selectively reverse the rotation of either of said fuel booster pumps in said right and left hand fuel tanks, said method during crossfeed fuel delivery wherein both engines are supplied with fuel pumped from one tank only, comprising reversing the rotation of the fuel booster pump in the unused tank to agitate the fuel therein and thereby expel entrained air or vapor therefrom and out said vent means whereby relatively air-free fuel is supplied from said unused tank upon termination of crossfeed fuel delivery and resumption of normal fuel delivery to both engines from respective right and left hand fuel supply systems.

3. The method according to claim 1 wherein said means for reversing rotation of said fuel booster pump is a pilot operated switch.

4. The method according to claim 2 wherein said means for reversing rotation of said fuel booster pump is automatically initiated upon opening said crossfeed fuel supply valve.

* * * * *